(12) United States Patent
Gerhard et al.

(10) Patent No.: US 7,752,543 B2
(45) Date of Patent: Jul. 6, 2010

(54) APPLYING EFFECTS TO A MERGED TEXT PATH

(75) Inventors: Lutz Gerhard, Seattle, WA (US); Michael J. Arvold, Seattle, WA (US); Michael Kallay, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1069 days.

(21) Appl. No.: 11/357,285

(22) Filed: Feb. 17, 2006

(65) Prior Publication Data

US 2007/0195095 A1    Aug. 23, 2007

(51) Int. Cl.
*G06F 17/22* (2006.01)
(52) U.S. Cl. .............. 715/256; 345/948; 715/200; 715/255; 715/269; 715/270; 715/275
(58) Field of Classification Search .......... 715/200, 715/255–256, 269, 270, 275
See application file for complete search history.

(56) References Cited

U.S. PATENT DOCUMENTS

| | | | |
|---|---|---|---|
| 5,170,442 A | 12/1992 | Murai et al. | |
| 5,355,449 A * | 10/1994 | Lung et al. | 345/467 |
| 5,438,656 A * | 8/1995 | Valdes et al. | 345/443 |
| 5,493,108 A * | 2/1996 | Cherry et al. | 235/462.12 |
| 5,524,182 A * | 6/1996 | Chari et al. | 358/1.11 |
| 5,577,177 A * | 11/1996 | Collins et al. | 345/469 |
| 5,600,772 A * | 2/1997 | Zhou et al. | 345/170 |
| 5,719,595 A * | 2/1998 | Hoddie et al. | 345/611 |
| 5,850,228 A * | 12/1998 | Hasegawa et al. | 345/471 |
| 6,209,010 B1 * | 3/2001 | Gauthier et al. | 715/234 |
| 6,437,793 B1 * | 8/2002 | Kaasila | 345/611 |
| 6,563,502 B1 * | 5/2003 | Dowling et al. | 345/469.1 |
| 6,628,295 B2 * | 9/2003 | Wilensky | 345/594 |
| 6,803,913 B1 * | 10/2004 | Fushiki et al. | 345/467 |
| 6,804,573 B2 * | 10/2004 | Goldman | 700/138 |
| 6,922,193 B2 | 7/2005 | Ritter | 345/426 |
| 6,952,210 B1 * | 10/2005 | Renner et al. | 345/471 |
| 7,302,438 B1 * | 11/2007 | Gauthier et al. | 707/100 |
| 7,315,979 B1 * | 1/2008 | Walker | 715/234 |

(Continued)

FOREIGN PATENT DOCUMENTS

KR    10-2004-0085659    10/2004

(Continued)

OTHER PUBLICATIONS

Phyllis Davis and Steve Schwartz; CorelDraw 10 for Windows: Visual QuickStart Guide; Nov. 6, 2001; Peachpit Press; pp. 4, 6.*

(Continued)

*Primary Examiner*—Doug Hutton
*Assistant Examiner*—Andrew R Dyer
(74) *Attorney, Agent, or Firm*—Merchant & Gould P.C.

(57) ABSTRACT

Effects are applied to a shape that is generated from a merged text path. The merged text path is created from text paths that are associated with a text run. Boolean operations may be used to create the merged text path. The merged text path removes any overlap and redundancy of the characters within the text run. The shape that is generated from the merged text path maintains the text path information that is associated with the text run such that additional effects may be applied to the shape.

17 Claims, 6 Drawing Sheets

U.S. PATENT DOCUMENTS

| | | | |
|---|---|---|---|
| 2004/0196288 A1* | 10/2004 | Han | 345/467 |
| 2004/0205667 A1* | 10/2004 | Hsu | 715/531 |
| 2004/0255249 A1* | 12/2004 | Chang et al. | 715/723 |
| 2005/0076001 A1* | 4/2005 | Gauthier et al. | 707/1 |
| 2005/0129328 A1* | 6/2005 | Saber et al. | 382/269 |
| 2005/0205671 A1* | 9/2005 | Gelsomini et al. | 235/384 |
| 2005/0286065 A1* | 12/2005 | Gauthier et al. | 358/1.13 |

FOREIGN PATENT DOCUMENTS

| | | |
|---|---|---|
| WO | WO 2007/100518 A1 | 9/2007 |

OTHER PUBLICATIONS

Klassen, V. "Variable width splines: a possible font representation?", Electronic Publishing, vol. 6(3), pp. 183-194, Sep. 1993.

Trigg, R. et al., "TEXTNET: A Network-Based Approach to Text Handling", ACM Transactions on Office Information Systems, vol. 4, No. 1, pp. 1-23, Jan. 1986.

PCT Search Report dated Jul. 12, 2007 cited in Application No. PCT/US2007/004046.

* cited by examiner

Fig.6

APPLYING EFFECTS TO A MERGED TEXT PATH

BACKGROUND

Many applications allow users to apply effects to text within a document. For example, warping, scaling, line effects as well as three dimensional effects may be applied to the text. Typically when these effects are applied to the text, each character within the text is converted to a bitmap and any effects are applied to each individual bitmap without taking into account the surrounding characters. Each of these individual bitmaps are then combined and displayed to show the entire word. The displayed word may have characters that overlap.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Effects are applied to a shape that is generated from a merged text path. The merged text path is created from a text paths that are associated with a text run. The merged text path removes overlap and redundancy of the characters within the text run. In this way, when effects are applied to the shape that is generated from the merged text path there is no overlap between the characters. Boolean operations may be used to create the merged text path from which the shape is generated. The shape that is generated from the merged text path maintains the text path information that is associated with the text run such that additional effects may be applied to the shape.

DETAILED DESCRIPTION

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
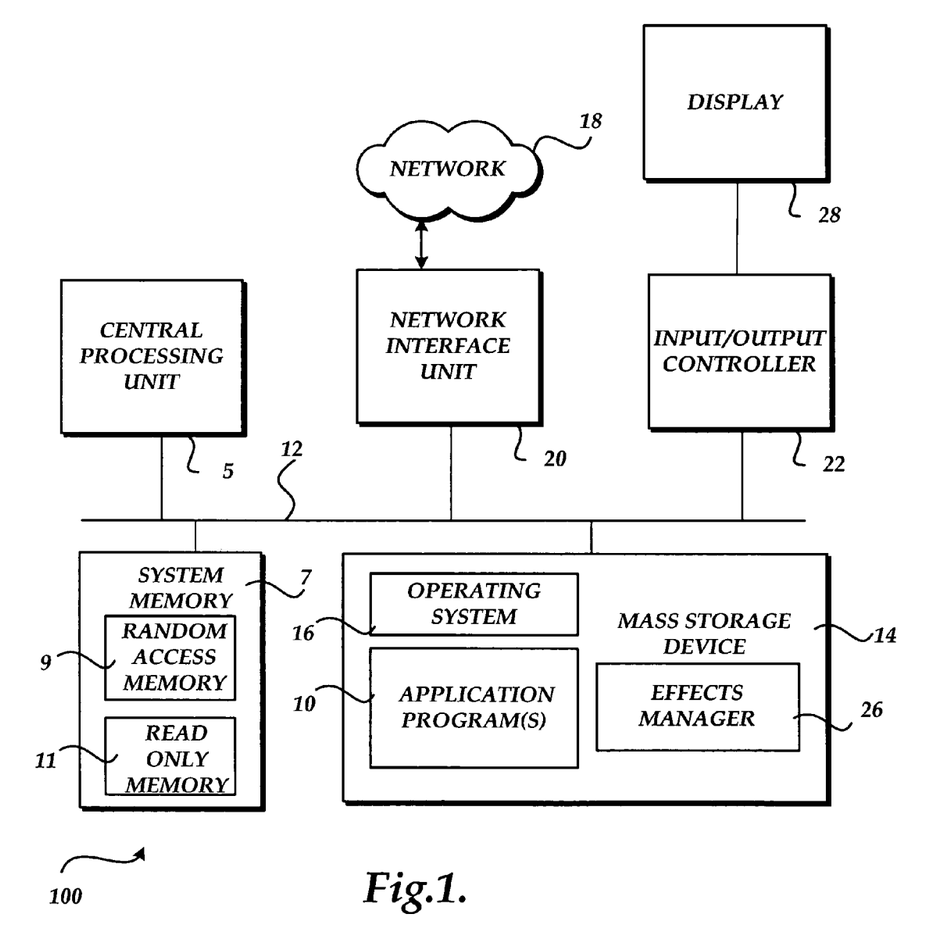
FIG. 1 illustrates an exemplary computing device.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 100 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen 28, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store one or more application programs 10. The application program(s) 10 is operative to apply effects to text. According to one embodiment, the application program(s) 10 comprises the MICROSOFT OFFICE suite of application programs from MICROSOFT CORPORATION. For example, application program 10 may be MICROSOFT WORD, POWERPOINT, EXCEL, ACCESS, PUBLISHER, OUTLOOK and the like. Other application programs that implement text effects may also be utilized. For instance, email programs, desktop publishing programs, presentation programs, and any other type of program that allows effects to be applied to text may be utilized.

The application program 10 may utilize an effects manager 26. Although effects manager 26 is shown separately from application program 10, it may be included within application program 10 or at some other location. For example, the effects manager 26 may be included in a graphics pipeline (See element 220 in FIG. 2), the operating system 16, and the like. As will be described in greater detail below, the effects manager 26 applies effects to a shape that is generated from a merged text path. The merged text path removes any overlap and redundancy of the characters within a text run. Generally, characters that are contained within a text run may be overlapping because of font settings. The font settings that typically affect the amount of overlap within the text run are the font face, the font size, the effects used, the kerning, and the character spacing used. The shape that is generated from the merged text path removes this overlap and maintains the text path information that is associated with the text run such that additional effects may be applied to the shape. For example, warping, scaling and line effects may be applied to the shape. A 3-D model of the text run may also be created from the shape that has different effects applied to it, such as extrusion, beveling, and the like. The operation of effects manager 26 will be described in more detail below.

Figure 2:
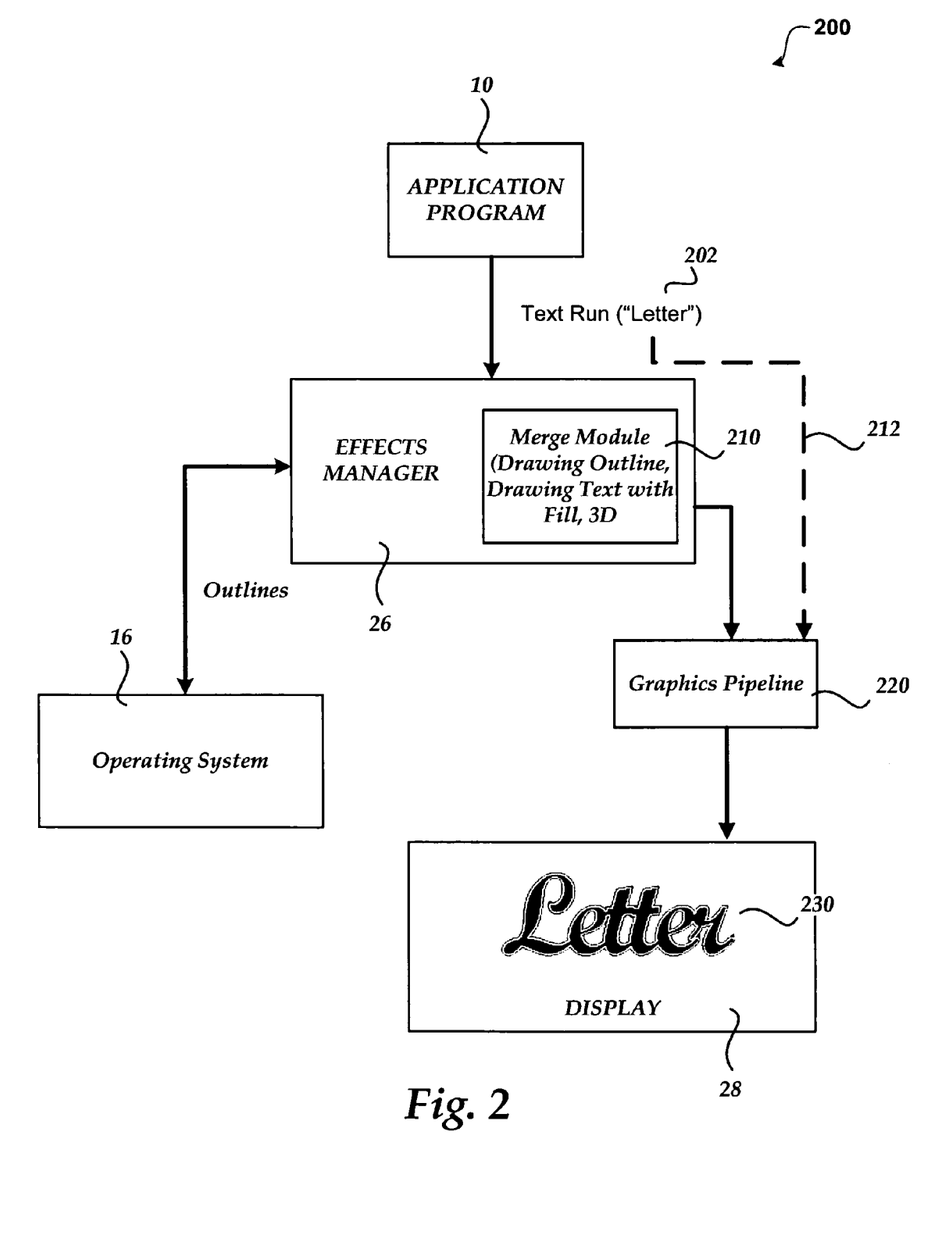
FIG. 2 shows an effects system.

FIG. 2 shows an effects system 200. As illustrated, effects system 200 includes application program 10, effects manager 26, merge module 210, operating system 16, graphics pipeline 220, and display 28. As described briefly above, the effects manager 26 creates a shape from a merged text path and applies effects to the shape. The merged text path is created from each text path that is associated with a text run (e.g. text 202) for application 10. As illustrated in system 200, application program 10 is configured to send text runs (e.g. text run 202) to effects manager 26. In the example illustrated, application program 10 has sent the text run "Letter" to effects manager 26. Any text run, however, may be sent to effects manager. The text run may be one or more characters. For example, a text run may be a few characters, a word, a sentence, and the like. Effects manager 26 may be configured to receive all or a portion of the text runs from application 10. For example, effects manager 26 may be configured to only receive text runs to which text effects are to be applied. For instance, if the text run 202 is to be rendered without effects, the text run may be sent directly to graphics pipeline 220 as illustrated by arrow 212. Generally each letter within a text run is made up of a text path that roughly describes its outline. For example, the text path for the upper case "L" in the Arial font illustrated in text run 202 consists of the six points that describe the outline of the letter.

Merge module 210 is configured to create a merged text path for a text run when instructed by effects engine 26. The merged text path is a single path from which a shape may be generated such that effects may be applied. Although merge module 210 is illustrated within effects manager 26 it may reside in many different locations within system 200. For example, merge module 210 may reside within application 10, operating system 16, and graphics pipeline 220. Alternatively, merge module 210 may be located independently from other modules within the system. Merge module 210 is configured to receive each text path for each letter in the text run (e.g. text run 202) and then compute a merged text path for the entire text run. According to one embodiment, merge module 210 uses Boolean operation to compute the merged text path. Alternatively, merge module 210 may be configured to create a merged text path for just the characters within the text run to which effects are to be applied. Each text path includes a set of points that make up the boundary for each character. Generally, merge module 210 computes a merged text path that represents the boundary (outline) for the entire text run. In the present example, the boundary for text run 202 includes the six characters making up "Letter." The boundary for the entire text run defines the union of the characters defined by their boundaries identified by the text paths. Merge module 210 removes the redundant pieces of the merged characters within the text run. The effects engine 26 may then create a shape from the single merged text path to which effects may be applied. The shape that is generated represents the entire merged shape. Since the merge module 210 eliminates the overlap between the shapes within the text run, a non-redundant 3-D model may be created from the text path.

For instance, in the present example, effects engine 26 has processed the text run "Letter" using merge module 210; applied effects to the generated shape representing "Letter" and then provided the graphics pipeline with the displayed version (230) of "Letter" which is shown on display 28.

Figure 3:
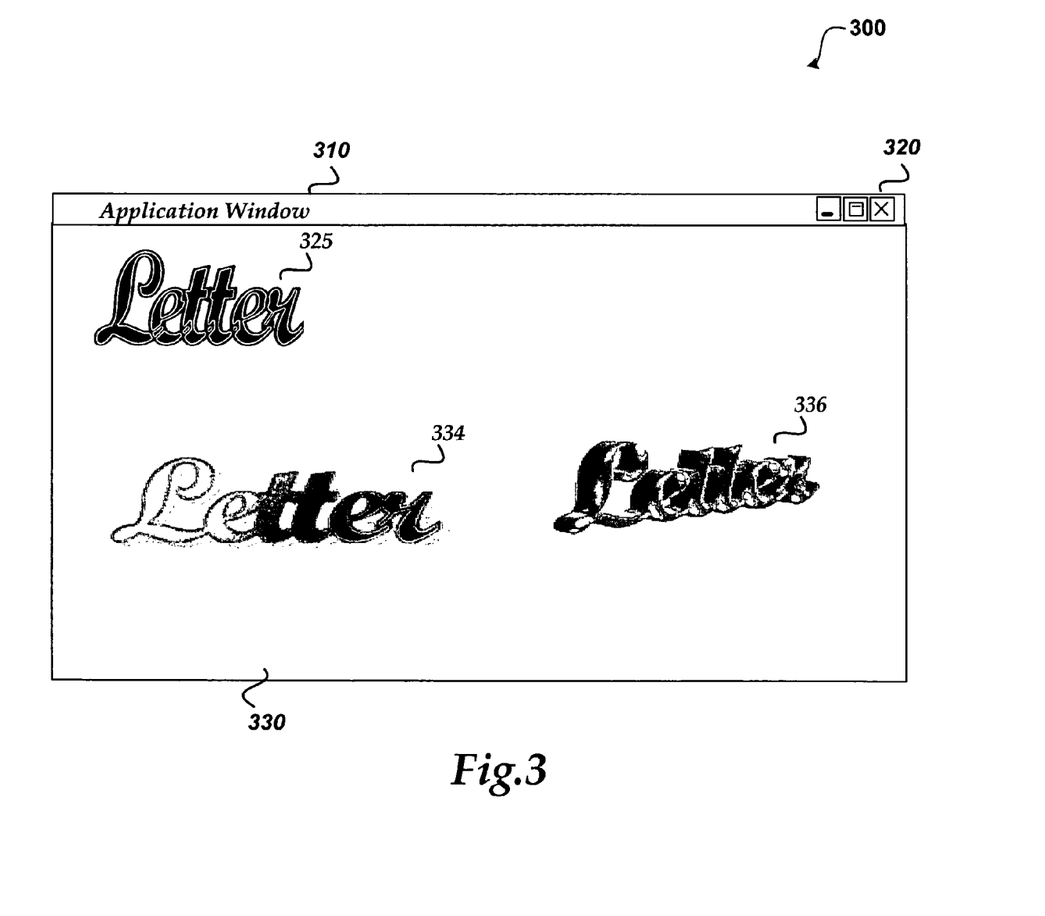
FIG. 3 illustrates an exemplary application window showing various effects applied to a text run.

FIG. 3 illustrates an exemplary application window 300 showing various effects applied to a text run. As illustrated, FIG. 3 includes application window 310, window elements 320, display area 330 and text runs 325, 334 and 336.

Text run 325 illustrates the overlap that results when effects are applied to a text run without generating a shape from a merged text path. As can be seen, each letter within the word "Letter" overlaps another letter.

Text run 334 illustrates the word "Letter" created using a shape that is generated from a merged text path and having the following effects applied: line, fill (gradient) and shadow effect applied to the text.

Text run 336 illustrates a 3-D model with bevel and extrusion created using the merged text path for the word "Letter." The extrusion is created by duplicating the shape that was generated from the merged text path at a different depth and connecting the two shapes. The bevel is created by refining an extruded 3-D model of a shape by applying a profile to the edges of a 3-D model.

Figure 4:
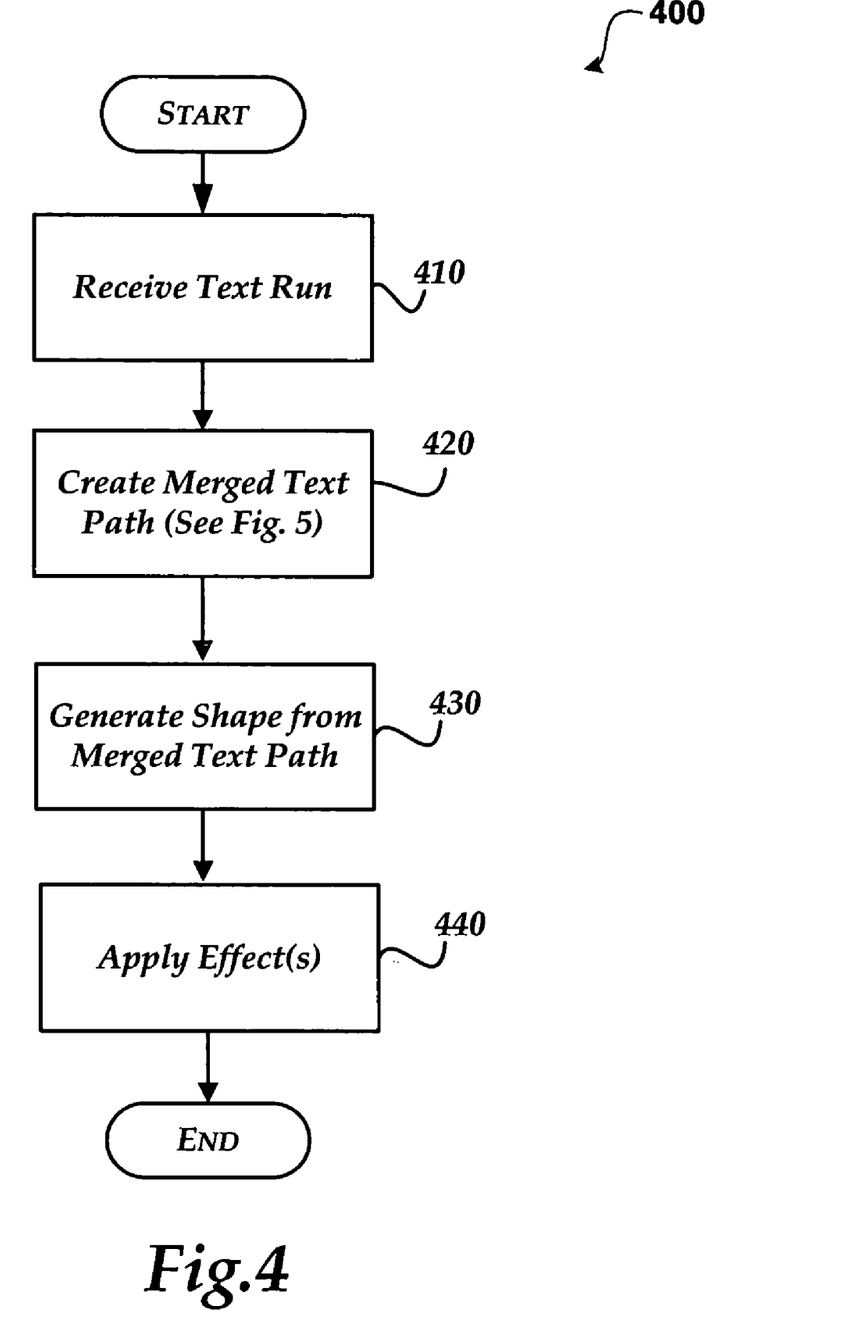
FIG. 4 shows a process for applying effects to a shape that is generated from a merged text path.
Figure 5:
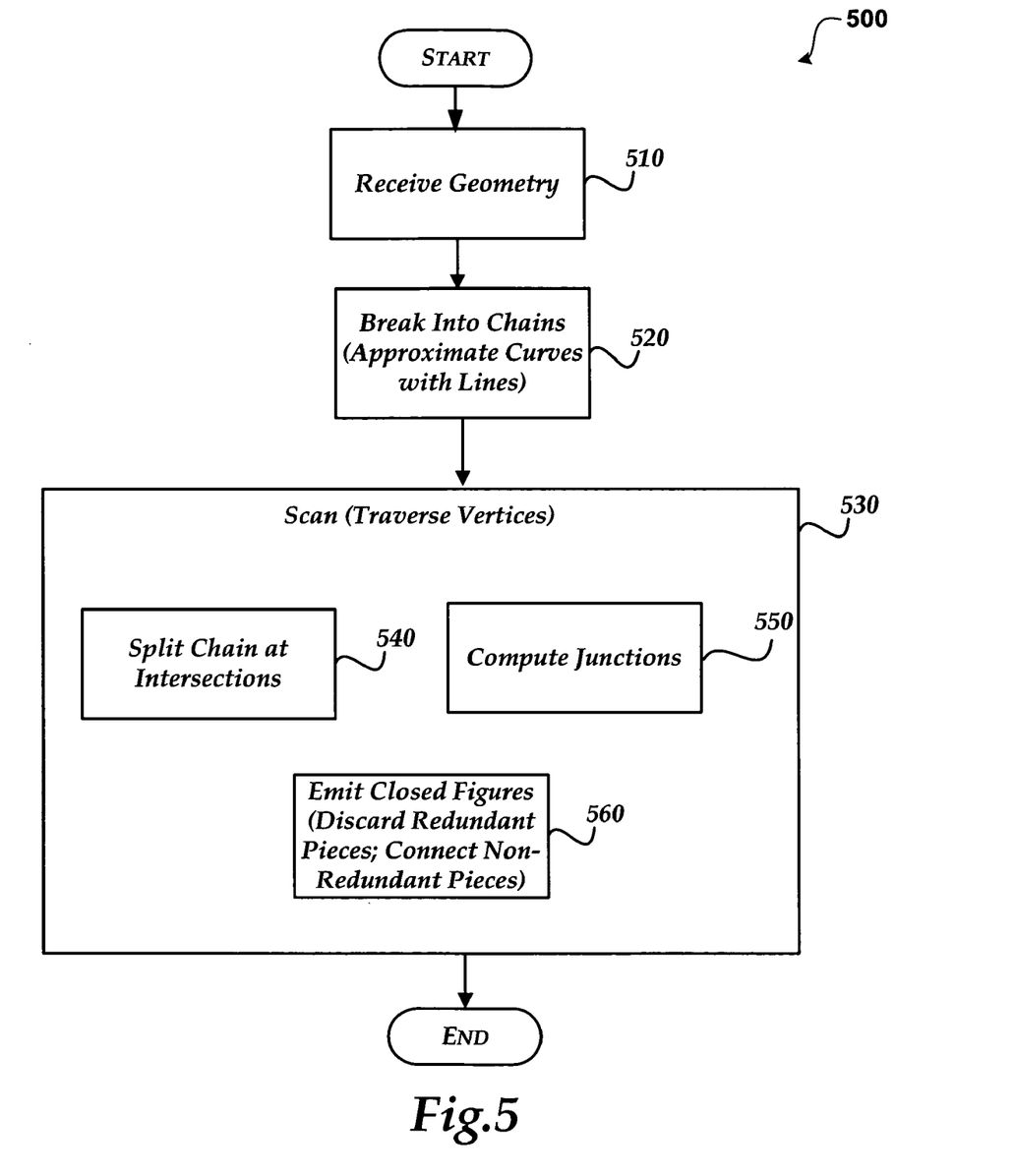
FIG. 5 illustrates a process for creating a merged text path using Boolean operations.

Referring now to FIGS. 4 and 5, an illustrative process for applying effects to a shape that is generated from a merged text path will be described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 4 shows a process for applying effects to a shape that is generated from a merged text path.

After a start operation, the process flows to operation 410 where a text run is received. Typically, the text run includes characters that make up a word and/or a sentence. More or less characters, however, may be included within the text run.

Moving to operation 420, a merged text path is created. The merged text path is created from the text paths that are associated with each character within the text run. The merged text path includes shape information for the outline of the text run. According to one embodiment, Boolean operations are used to create the merged text path (See FIG. 5 and related discussion).

Transitioning to operation 430, a shape is generated from the merged text path. As discussed herein, the shape represents the merged text path that has removed the redundant portions.

Flowing to operation 440, any desired effects may be applied to the generated shape. The text path information is not lost when the shape is generated. The shape can still undergo further transformations, such as warping, scaling and other effects. The process then flows to an end operation where the process returns to processing other actions.

FIG. 5 illustrates a process for creating a merged text path using Boolean operations.

After a start operation, the process flows to operation 510 where the geometry associated with each character within the text run is received. The received geometry generally consists of 2D regions represented in terms of their boundaries. Each boundary is a collection of closed figures that may be represented by three classes of points. These classes of points include points inside the boundary, points outside the boundary, and points on the boundary. Generally, given a point its containment may be determined by casting an infinite ray from the point, tallying its intersections with the boundary, and then applying some rule.

This in/out containment query on a single point is straightforward, but some queries and constructions require deeper analysis and processing of the boundary itself. Generally, the non-intersecting pieces of the boundary for the text run are examined to identify redundant pieces and then the non-redundant pieces are classified according to their orientation relative to the region having effects applied.

Moving to operation 520, the geometry is broken into chains. According to one embodiment, the curved shapes within the geometry are approximated by polygons. As defined herein, a chain is a segment of the polygon with vertices in descending height. According to one embodiment, the polygon's vertices are processed in descending order. The order may be lexicographic, by y coordinate, or by x coordinate when y coordinates are equal. According to one embodiment, the chain has a generic pointer which is used for holding additional data that it may need. The chains are inserted in a main chain list that is sorted by the height of their head vertices. According to one embodiment, ascending vertex sequences are constructed as chains in reverse with their original direction recorded.

Transitioning to operation 530, the vertices of the chains are scanned. According to one embodiment, the vertices are traversed in decreasing height. The most recently processed vertex on a chain is the chain's cursor. The next vertex down the chain is the chain's candidate vertex. A chain becomes active when its head is encountered, and is deactivated after its last vertex has been processed.

According to one embodiment, two working lists of chain references are maintained including an active chains list and a candidate chains list. The active chains list contains the chains that have edges at the current processing height, sorted horizontally from left to right. The candidate chains list contains the active chains sorted by the height of their candidate vertices. According to one embodiment, the vertex coordinates rounded to a grid of integers. In addition to their approximate coordinates, new vertices that are formed by edge intersections store the information of the intersecting segments that formed them. Instead of comparing approximate numbers, queries on such vertices compare the expressions that define the numbers that need to be compared. Interval arithmetic is used to compute an interval that is guaranteed to contain the numerical result of every computation. Comparing the computation results can then be done unambiguously as long as the compared intervals are disjoint, which occurs most of the time. When the compared intervals do overlap, the process resorts to computation done by an exact arithmetic package for a definite answer. The scanning loop 530 comprises three different operations, including: splitting the chains at intersections 540; computing junctions 550 and emitting closed figures 560. These operations may occur repeatedly during the scanning operation.

Operation 540 splits the chain at its intersections. The first (highest) vertex in a chain is its head, and the last (lowest) vertex is its tail. When any other vertex is processed, the edge below that vertex is examined for intersections with its left and right neighbors in the active list. When an intersection is found the chains are split. The newly split chains (below the intersection) are inserted in the master chain list. A version of the Bentley-Ottman algorithm for identifying the intersections between a given set of line segments may be utilized. A chain in the main chain list is activated by inserting it into the working lists (the active list and the candidate list) and its cursor is then placed at its head. After its tail has been processed, an active chain is removed from the working lists. If a chain is being split (at an intersection) it is removed from the candidate list and reinserted according the height of the intersection vertex, which is now the chain's candidate (and tail) vertex.

When a vertex is picked for processing from the candidate list, the chain is removed from that list, the cursor is moved to the candidate, and then processed. If there is a vertex below it, it becomes the candidate, and the chain is inserted in the candidate list according to the height of that candidate vertex. If there is no candidate vertex, a junction is set there, and the chain is deactivated after the junction is processed. Operation 540 may occur at any vertex when it is processed.

Junctions are computed at operation 550. When a new chain is activated, or when the tail of an existing chain is processed, a junction is established and populated with all the chains whose heads or tails coincide with it. The former are called head-chains and the latter tail-chains. If triggered by activating a new chain then the junction's location among the active chains is set by examining its position relative to their active edges. Neighboring chains are gathered and added to the junction as tail-chains if their tails coincide with the junction. Additional chains are added to a junction from the master list as head-chains if their heads coincides with the junction. The head-chains are sorted from left to right by their direction at the junction. Any pair of chains whose first edges are collinear are split at the tip of the shorter edge. The junction's leftmost and rightmost head-chains are tested and split if they intersect with their neighbors. If the junction has no head-chains then its left and right neighbors (who will become each other's neighbors after the junction is gone) are tested and split if they intersect. All the new head-chains are then classified (as left, right or redundant) using a classifier object. There are currently two types of classifiers. One for classifying a single shape based on its fill rule and another which in addition classifies the boundary of two shapes based on mutual containment of each other's edges and marks redundant chains based on the type of Boolean operation.

Operation 560, emits closed figures. Emitting the closed figures for a region refers to breaking the region's boundary into non-intersecting pieces, removing the redundant ones, and connecting the non-redundant remaining ones into simple consistently-oriented loops. Operation 560 may occur when any junction is processed. The process then moves to an end block and returns to processing other actions.

Figure 6:
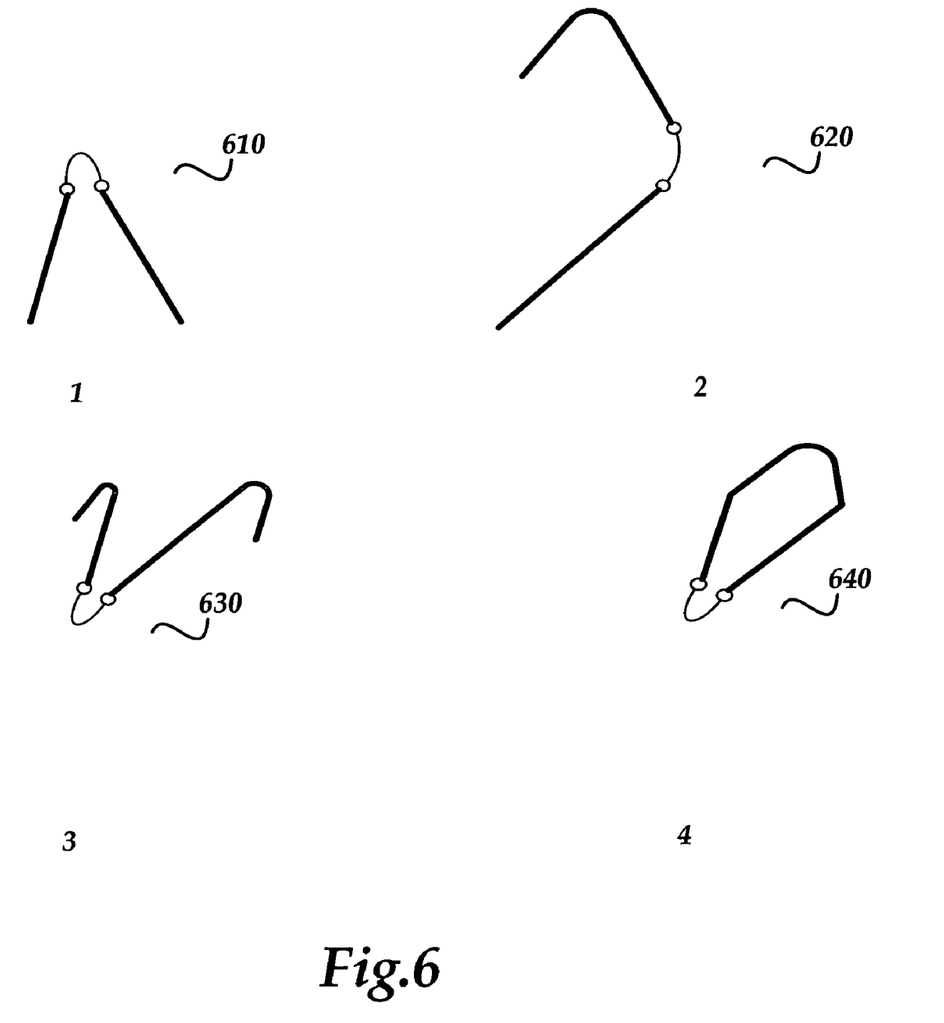
FIG. 6 shows how chains are connected to form an outline.

FIG. 6 shows how chains are connected to form an outline.

Starting with a string of chains having a pair of head-chains (610) a tail-chain is connected to a head-chain (620). Two tail chains are connected and their string of chains are concatenated if they are distinct (630). A closed figure is harvested if they belong to the string of chains (640).

The decision as to which actions to take is based on the classification of chains (as left, right or redundant), and on the counts and parity of head and tail chains at the junction.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for applying effects, comprising:
   receiving a text run, the text run including two or more characters;
   creating a merged text path for the text run, the creation of the merged text path comprising:
      receiving geometry that is associated with the text run, the geometry including one or more curved shapes;
      approximating the one or more curved shapes into polygons;
      breaking the geometry into chains, at least one chain comprising a segment of a polygon, the segment of the polygon derived from the one or more curved shapes, the at least one chain including three or more vertices, the three or more vertices including a head vertex and a tail vertex, the head vertex being the first vertex in the chain and the tail vertex being the last vertex in the chain;
      computing junctions, a junction being established when a new chain is activated or when the tail vertex of an existing chain is processed, the junction having the coordinate location of the head vertex of the new chain or the tail vertex of the existing chain, the junction including one or more head vertices or tail vertices having the same coordinates as the junction;
      discarding redundant chains;
      connecting non-redundant pieces to form an outline;
      determining whether two adjacent characters in the text run overlap; and
      when it is determined that two adjacent characters in the text run overlap, removing the overlap between the two adjacent characters, the overlap being removed by removing one or more redundant pieces of the overlapping, merged characters within the text run;
   generating a single shape from the merged text path; and
   applying an effect to the single shape.

2. The method of claim 1, wherein receiving the text run comprises receiving at least two adjacent characters to which effects are to be applied.

3. The method of claim 1, wherein generating the single shape from the merged text path comprises maintaining text properties that are associated with the text run.

4. The method of claim 1, wherein creating the merged text path comprises determining an outline of the text run.

5. The method of claim 1, wherein applying the effect comprises applying a line effect to the text run.

6. The method of claim 1, wherein applying the effect comprises applying an extrusion and a beveling effect.

7. A computer-readable storage medium having computer-executable instructions for applying effects to a text run, the instructions comprising:
   receiving a text run to which a first effect is to be applied, the text run including two or more characters;
   creating a merged text path for the text run, the creation of the merged text path comprising:
      receiving geometry that is associated with the text run, the geometry including one or more curved shapes;
      approximating the one or more curved shapes into polygons;
      breaking the geometry into chains, at least one chain comprising a segment of a polygon, the segment of the polygon derived from the one or more curved shapes, the at least one chain including three or more vertices, the three or more vertices including a head vertex and a tail vertex, the head vertex being the first vertex in the chain and the tail vertex being the last vertex in the chain;
      computing junctions, a junction being established when a new chain is activated or when the tail vertex of an existing chain is processed, the junction having the coordinate location of the head vertex of the new chain or the tail vertex of the existing chain, the junction including one or more head vertices or tail vertices having the same coordinates as the junction;
      discarding redundant chains;
      connecting non-redundant pieces to form an outline;
      determining whether two adjacent characters in the text run overlap; and
      when it is determined that two adjacent characters in the text run overlap, removing the overlap between the two adjacent characters, the overlap being removed by removing one or more redundant pieces of the overlapping, merged characters within the text run;
   generating a single shape from the merged text path; and
   applying the first effect to the single shape.

8. The computer-readable storage medium of claim 7, wherein receiving the text run to which the effect is to be applied comprises receiving characters that form a word; and wherein each character includes text path information.

9. The computer-readable storage medium of claim 7, wherein generating the single shape from the merged text path comprises storing text properties that are associated with the text run such that a second effect may be applied to the single shape after the first effect has been applied.

10. The computer-readable storage medium of claim 7, wherein creating the merged text path comprises determining an outline of the text run.

11. The computer-readable storage medium of claim 7, wherein applying the effect comprises applying a line effect to the text run.

12. The computer-readable storage medium of claim 7, wherein applying the effect comprises applying an extrusion and a beveling effect.

13. A computing apparatus for applying effects to a text run, comprising:
   a processor and a computer-readable storage medium;
   an operating environment stored on the computer-readable storage medium and executing on the processor;
   a display;
   an application operating under the control of the operating environment and operative to generate a text run to which an effect is to be applied; and
   an effects engine that is configured to:
      receive the text run, the text run including two or more characters;

create a merged text path for the text run by further configuring the effects engine to:

receive geometry that is associated with the text run, the geometry including one or more curved shapes;

approximate the one or more curved shapes into polygons;

break the geometry into chains, at least one chain comprising a segment of a polygon, the segment of the polygon derived from the one or more curved shapes, the at least one chain including three or more vertices, the three or more vertices including a head vertex and a tail vertex, the head vertex being the first vertex in the chain and the tail vertex being the last vertex in the chain;

compute junctions, a junction being established when a new chain is activated or when the tail vertex of an existing chain is processed, the junction having the coordinate location of the head vertex of the new chain or the tail vertex of the existing chain, the junction including one or more head vertices or tail vertices having the same coordinates as the junction;

discard redundant chains;

connect non-redundant pieces to form an outline;

determine whether two adjacent characters in the text run overlap; and when it is determined that two adjacent characters in the text run overlap, remove any overlap between the two adjacent characters, the overlap being removed by removing one or more redundant pieces of the overlapping, merged characters within the text run;

generate a single shape from the merged text path;

apply the effect to the single shape; and display the single shape on the display.

14. The apparatus of claim 13, wherein generating the single shape from the merged text path comprises maintaining text properties that are associated with the text run.

15. The apparatus of claim 14, further comprising creating an outline from the merged text path.

16. The apparatus of claim 13, wherein creating the merged text path for the text run comprises using Boolean operations.

17. The apparatus of claim 14, wherein applying the effect comprises applying an effect selected from: a line effect; a scaling; a shadowing; an extrusion and a beveling.

* * * * *